United States Patent
Alanen et al.

(10) Patent No.: US 7,277,054 B2
(45) Date of Patent: Oct. 2, 2007

(54) METHOD FOR POSITIONING, A POSITIONING SYSTEM, AND AN ELECTRONIC DEVICE

(75) Inventors: Kimmo Alanen, Lempäälä (FI); Ilkka Kontola, Julkujärvi (FI); Jari Syrjärinne, Tampere (FI); Harri Valio, Kämmenniemi (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/081,294

(22) Filed: Feb. 21, 2002

(65) Prior Publication Data

US 2002/0149515 A1    Oct. 17, 2002

(30) Foreign Application Priority Data

Feb. 23, 2001  (FI)  ................... 20010365

(51) Int. Cl.
  *G01S 3/02*  (2006.01)
  *G01S 5/14*  (2006.01)
(52) U.S. Cl. ............... 342/464; 342/357.15; 455/456.1
(58) Field of Classification Search ............ 342/357.1, 342/357.09, 457, 464; 455/440, 456.1, 456.5, 455/456.6
See application file for complete search history.

(56) References Cited

U.S. PATENT DOCUMENTS

| | | | | |
|---|---|---|---|---|
| 4,112,421 A | * | 9/1978 | Freeny, Jr. | ................... 342/457 |
| 4,209,787 A | * | 6/1980 | Freeny, Jr. | ................... 342/457 |
| 4,864,313 A | * | 9/1989 | Konneker | ................... 342/457 |
| 5,883,594 A | * | 3/1999 | Lau | ................... 342/357.1 |
| 6,121,928 A | | 9/2000 | Sheynblat et al. | ........... 342/463 |
| 6,188,351 B1 | | 2/2001 | Bloebaum | ............... 342/357.15 |
| 6,433,735 B1 | * | 8/2002 | Bloebaum et al. | ........ 342/357.1 |
| 6,865,395 B2 | * | 3/2005 | Riley | ....................... 455/456.1 |
| 2001/0036833 A1 | * | 11/2001 | Koshima et al. | ............ 455/457 |

FOREIGN PATENT DOCUMENTS

| | | |
|---|---|---|
| WO | WO97/38548 | 10/1997 |
| WO | WO98/25158 | 6/1998 |
| WO | WO/99/47943 | 9/1999 |
| WO | WO 00/38460 | 6/2000 |

* cited by examiner

*Primary Examiner*—Gregory C. Issing
(74) *Attorney, Agent, or Firm*—Perman & Green, LLP

(57) ABSTRACT

A method for positioning a wireless communication device where position data of one or a plurality of reference points is stored into at least one data base, and which of the reference points is located in the vicinity of the wireless communication device is determined. The method also includes transmitting at least position data of the reference point located in the vicinity of the wireless communication device to the wireless communication device and selecting the reference point located in the vicinity of the wireless communication device as the default location of the wireless communication device.

48 Claims, 3 Drawing Sheets

METHOD FOR POSITIONING, A POSITIONING SYSTEM, AND AN ELECTRONIC DEVICE

FIELD OF THE INVENTION

The present invention relates to a method for positioning of a wireless communication device. The invention further relates to a positioning system to be used in the positioning of a wireless communication device. The invention relates also to an electronic device to be used in a positioning system, which electronic device comprises at least positioning means and means for performing functions of a mobile communication device.

BACKGROUND OF THE INVENTION

In positioning systems based on satellite positioning, a positioning receiver attempts to receive signals of at least four satellites in order to detect the position of the positioning receiver and the time data. An example of such a satellite positioning system is the GPS system (Global Positioning System) comprising a plurality of satellites orbiting the globe according to predefined orbits. These satellites transmit positioning data, on based of which the position of a satellite can be defined at each moment of time, in case the exact time data used in the satellite positioning system is known in the positioning receiver. In the GPS system, the satellites transmit a spread spectrum signal which is modulated with a code that is individual for each satellite. Thus, the positioning receiver can distinguish signals transmitted by different satellites from each other by using a reference code corresponding to the satellite code generated locally in the positioning receiver.

A drawback with such positioning systems based on satellite positioning is often the fact that a signal transmitted by a satellite is strongly attenuated when arriving to the positioning receiver, wherein it is very difficult to distinguish the signal from the background noise. The signal can be attenuated inter alia due to climatic conditions and obstacles, such as buildings and surrounding grounds in the routing of the signal. Also, the signal can wander to the positioning receiver through a plurality of different routes which causes so-called multipath propagation and aggravates the synchronizing of the positioning receiver to a wished signal because the transmitted signal arrives to the receiver through different routings, for example straight from the satellite (line-of-sight) and, in addition to this; reflected. Due to this multipath propagation the same signal is received as a plurality of signals with different phases. It is particularly difficult to perform positioning inside a building, because a building itself strongly attenuates the signal transmitted by satellites and, on the other hand, multipath propagation can be even stronger since possibly reflected signals coming for example through a window are not necessarily as attenuated as signals coming straight through the roof. In this case, the receiver can make erroneous interpretations about the time of flight and the positioning of the satellite during the moment of transmission, inter alia due to said increase in the signal time-of-flight caused by multipath propagation Each operating satellite of the GPS system transmits a so-called L1 signal in the carrier frequency of 1575.42 MHz. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, these signals are modulated with at least one pseudo random sequence. This pseudo random sequence is different for each satellite. As a result of the modulation, a code-modulated wideband signal is produced. The modulation technique used makes it possible to distinguish in the receiver the signals transmitted by different satellites, even though the carrier frequencies used in the transmission are substantially the same. This modulation technique is called code division multiple access (CDMA). In each satellite, for modulating the L1 signal, the pseudo sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with a polynome $X^{10}+X^3+1$, and the second binary sequence G2 is formed by delaying the polynome $X^{10}+X^9+X^8+X^6+X^3+X^2+1$ in such a way that the delay is different for each satellite. This arrangement makes it possible to produce different C/A codes by an identical code generator. The C/A codes are thus binary codes whose chipping rate in the GPS system is 1.023 MHz. The C/A code comprises 1023 chips, wherein the iteration time (epoch) of the code is 1 ms. The carrier wave of the L1 signal is further modulated by navigation information at a bit rate of 50 bit/s. The navigation information comprises information about the "health", orbit, time data of the satellite, etc.

During their operation, the satellites monitor the condition of their equipment. The satellites may use for example so-called watchdog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. Furthermore, in a situation in which the signal of more than four satellites can be received, the information received from different satellites can be weighted differently on the basis of the health data. Thus, it is possible to minimize the effect of errors on measurements, possibly caused by satellites which seem unreliable.

To detect the signals of the satellites and to identify the satellites, the receiver must perform acquisition, whereby the receiver searches for the signal of each satellite at the time and attempts to be synchronized and locked to this signal so that the data transmitted with the signal can be received and demodulated.

The positioning receiver must perform the acquisition e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming in the receiver.

The positioning arrangement has two primary functions:
1. to calculate the pseudorange between the receiver and the different GPS satellites, and
2. to determine the position of the receiver by utilizing the calculated pseudoranges and the position data of the satellites. The current position data of the satellites can be calculated on the basis of the Ephemeris and time correction data received from the satellites.

Distances to the satellites are called pseudoranges, because the time is not accurately known in the receiver. Thus, the determinations of position and time are repeated until a sufficient accuracy is achieved with respect to time and position. Because the time is not known with absolute precision, the position and the time must be determined e.g. by linearizing a set of equations for each new iteration.

A pseudorange can be calculated by measuring the pseudo transmission time delays between signals of different satellites.

Almost all known GPS receivers utilize correlation methods for acquisition to the code as well as for tracking. In a positioning receiver, reference codes ref(k), i.e. the pseudo random sequences for different satellites are stored or generated locally. A received signal is subjected to conversion to an intermediate frequency (down conversion), whereafter the receiver multiplies the received signal with the stored pseudo random sequence. The signal obtained as a result of the multiplication is integrated or low-pass filtered, wherein the result obtained is data about whether the received signal contained a signal transmitted by a satellite. The multiplication is iterated in the receiver so that the phase of the pseudo random sequence stored in the receiver is shifted each time. The correct phase is inferred from the correlation result preferably so that when the correlation result is at its peak, the correct phase has been detected. Thus, the receiver is correctly synchronized with the received signal. After the code acquisition has been completed, the next steps are frequency tuning and phase locking.

The above-mentioned acquisition and frequency control process must be performed for each signal of a satellite received in the receiver. Some receivers may include several receiving channels, wherein an attempt is made on each receiving channel to be synchronized with the signal of one satellite at a time and to detect the information transmitted by this satellite.

The positioning receiver receives information transmitted by satellites and performs positioning on the basis of the received information. For the positioning, the receiver must receive a signal transmitted by at least four different satellites to find out the x, y, z coordinates and the time data. The received navigation information is stored in a memory, wherein this stored information can be used to find out e.g. the positioning data of satellites.

FIG. 1 shows, in a principle chart, positioning, by means of a signal transmitted from four satellites SV1, SV2, SV3, SV4 in a wireless communication device MS comprising a positioning receiver. In the GPS system, the satellites transmit positioning data as well as time data, on the basis of which the positioning receiver can perform calculations to determine the current position of the satellite. These positioning data and time data are transmitted in frames which are further divided into subframes. In the GPS system, each frame comprises 1500 bits, which are divided into five subframes of 300 bits each. Since the transmission of one bit takes 20 ms, the transmission of each subframe thus takes 6 s, and the whole frame is transmitted in 30 seconds. The subframes are numbered from 1 to 5. In each subframe 1, e.g. time data is transmitted, indicating the moment of transmission of the subframe as well as information about the deviation of the satellite clock with respect to the time in the GPS system.

The subframes 2 and 3 are used for the transmission of positioning data. The subframe 4 contains other system information, such as universal time, coordinated (UTC). The subframe 5 is intended for the transmission of almanac data of all the satellites. The entity of these subframes and frames is called a GPS navigation message which comprises 25 frames, i.e. 125 subframes. The length of the navigation message is thus 12 min 30 s.

In the GPS system, time is measured in seconds from the beginning of a week. In the GPS system, the starting time of a week is the midnight between a Saturday and a Sunday. Each subframe to be transmitted contains information on the moment of the GPS week when the subframe in question was transmitted. Thus, the time data indicates the time of transmission of a certain bit, i.e. in the GPS system, the time of transmission of the last bit in the subframe in question. In the satellites, time is measured with high-precision atomic chronometers. In spite of this, the operation of each satellite is controlled in a control centre for the GPS system (not shown), and e.g. a time comparison is performed to detect chronometric errors in the satellites and to transmit this information to the satellite.

In the precision of positioning it is of great importance how precisely the actual GPS time is known by the receiver. In practice, the precise GPS time can be determined after positioning calculation, in which the chronometric error of the receiver is determined relative to the GPS time. However, in the very first positioning calculation an estimation of the GPS time can be used, because the actual GPS time is not necessarily known in the receiver. The estimated GPS time at a moment of time k can be derived on the basis of measurement of three time elements according to the following formula:

$$T_{GPS}^{j}(k)=T_{ToW}^{j}(k)+T_{ms}^{j}(k)+T_{chip}^{j}(k)+0.078 \quad (1)$$

in which $T_{ToW}^{j}$=the time data (time of week) in seconds contained in the last received subframe, $T_{ms}^{j}(k)$=the time in seconds corresponding to the number of C/A epochs received after the beginning of the last received subframe, $T_{chip}^{j}(k)$=the time in seconds corresponding to the number (from 0 to 1022) and code phase of whole chips received after the change of the last epoch, and j=the receiving channel index.

In Formula 1, the average time of flight (ToF) of the signal from the satellite to the receiver is 78 ms. As a reference it is possible to use any such receiving channel in which the signal-to-noise ratio (SNR) is sufficient.

The time data (ToW) is transmitted in the navigation message at intervals of six seconds and it indicates the time passed from the last change of the GPS week. Thus, the value range of the time data is the remainder of one week. In a corresponding manner $T_{ms}^{j}(k)$ equals the remainder of six seconds and $T_{chip}^{j}(k)$ equals the remainder of 1 ms. The first three terms of the Formula (1) can also be used in the measurement of the time of arrival (ToA) of the signal.

In poor receiving conditions in which the navigation data cannot be indicated inter alia due to a high bit error rate (BER), it is not possible, due to the missing time data ToW, to determine the GPS time directly by means of the Formula 1. However, the code phase can normally still be measured.

The first three terms in the Formula 1 determine the time of transmission $\hat{T}_{ToT}^{k}$ of the received signal.

SUMMARY OF THE INVENTION

It is an aim of the present invention to provide an improved positioning method and a positioning receiver in which as the default location of the positioning receiver is used the location of a known reference point, which can be detected in a data base, or the like. The data base is preferably arranged in a data network, such as the Internet network and/or a mobile communication network. Moreover, the positioning data of one or a plurality of reference points can be stored into an electronic device comprising a positioning receiver. The invention is based on the idea that as the default position of the electronic device is used the position of a such reference point whose position is known, and this position of the reference point is stored in the data base, wherein this positioning data is retrieved from the storage location to the electronic device. In case the positioning data are not stored in the electronic device, they are retrieved at the time when the positioning is wished to be performed. More precisely, the method according to the present invention is primarily characterized in that position data of one or a plurality of reference points is stored to at least one data base, it is examined which of said reference points is located in the vicinity of the wireless communication device, and at least position data about said reference point located in the vicinity of the wireless communication device is transmitted to the wireless communication device, wherein in order to perform the positioning, said reference point located in the vicinity of the wireless communication device is selected as the default position of the wireless communication device. The positioning system according to the present invention is primarily characterized in that the positioning system comprises at least one data base for storing one or a plurality of reference points, means for detecting which of said reference points is located in the vicinity of the wireless communication device, means for transmitting the position data of the reference point located in the vicinity of said wireless communication device to the wireless communication device, wherein for performing the positioning, said reference point in the vicinity of the wireless communication device is arranged to be selected as the default position of the wireless communication device. The electronic device according to the present invention is primarily characterized in that the electronic device further comprises means for detecting which of the reference points stored in the data base of the positioning system is located in the vicinity of the wireless communication device, means for receiving the position data of the reference point located in the vicinity of the wireless communication device, and means for selecting the reference point located in the vicinity of said wireless communication device as the default position of the wireless communication device in the positioning.

Considerable advantages are achieved by the present invention when compared to the positioning methods and receivers of prior art. Since the method of the invention uses, as the default position of the electronic device, the position of a reference point, preferably a base station of a mobile communication network that is situated relatively close to the electronic device, and auxiliary data is transmitted to the electronic device, the real position of the electronic device can be detected relatively fast. Additional advantages are provided in the method by the fact that the electronic device stores the auxiliary data and location data of the reference points it has received, wherein it is not always necessary for the electronic device to detect this information by using the mobile communication network, which reduces network traffic. In addition, this kind of retrieval of auxiliary data from a mobile communication network is usually subject to charge, wherein the costs of the positioning system paid by the user can be cut down by the arrangement of the invention. Yet another advantage to be mentioned is that the decrease in network traffic reduces also the power consumption of the electronic device, which is beneficial particularly in portable electronic devices. The use of the method according to the invention allows positioning also indoors, which is not necessarily possible with prior art solutions.

DESCRIPTION OF THE DRAWINGS

In the following, the present invention will be described in more detail with reference to the appended drawings, in which.

DETAILED DESCRIPTION OF THE INVENTION

Figure 1:
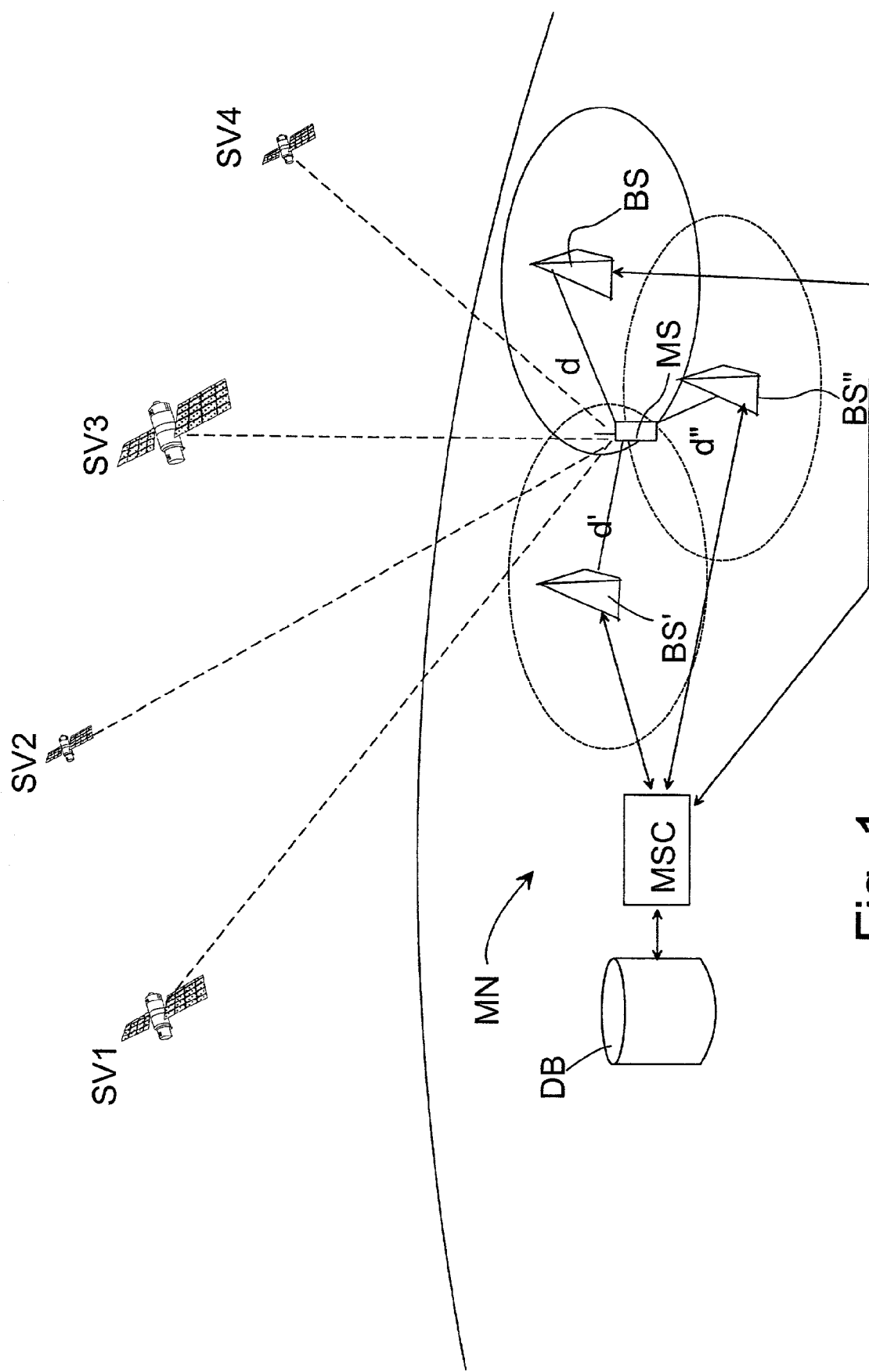
FIG. 1 shows the method according to a preferred embodiment of the invention in a reduced manner.

In the following, the operation of the method according to a preferred embodiment of the invention will be described with reference to the system shown in FIG. 1. An electronic device performing positioning is in FIG. 2 exemplified by a wireless communication device MS comprising, in addition to the mobile communication means MT, also a positioning receiver PR. Thus, the mobile communication means MT can be used for transmitting information between the wireless communication device MS and the base stations BS, BS', BS" of the mobile communication network MN.

Figure 2:
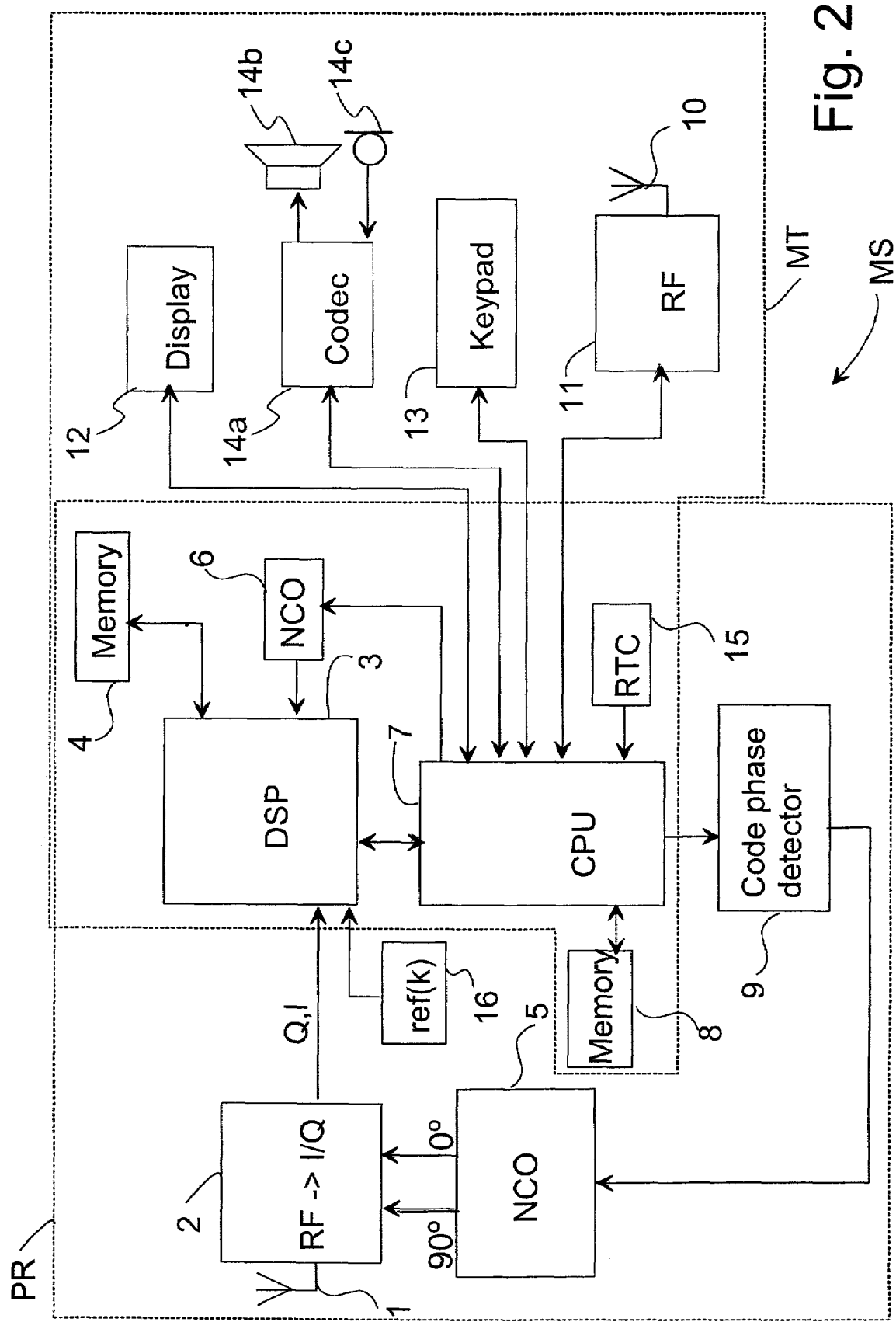
FIG. 2 shows an electronic device according to a preferred embodiment of the invention in a reduced block chart.

In a positioning receiver PR according to FIG. 2, a signal to be received via a first antenna 1 is converted preferably to an intermediate frequency in the converter block 2. The signal converted to the intermediate frequency comprises two components known as such: I and Q components, with a phase difference of approximately 90° therebetween. These analog signal components converted to the intermediate frequency are digitized. During the digitizing of the signal components, preferably at least one sample is taken of each chip, ie. preferably at least 1,023,000 samples per second are thus taken in the GPS system. Furthermore, the I and Q components of the digitized signal are multiplied by a signal formed by a first numerically controlled oscillator (NCO) 5. The purpose of the signal of this first numerically controlled oscillator 5 is to correct the frequency deviation caused by the Doppler shift and a frequency error of the local oscillator (not shown) of the receiver. The signals formed in the converter blocks 2 are preferably led to a digital signal processor 3. Reference codes ref(k) corresponding to the codes used in code modulation of the satellites to be received at a time are generated in block 16. Using e.g. this reference code ref(k), the positioning receiver PR attempts to find the code phase and frequency deviation of the signal of the satellite received on each receiving channel, to be used in the operations after the synchronization.

A control block 7 is used for controlling inter alia a code phase detector 9 which is used for adjusting the frequency of the numerically controlled oscillator 5, if necessary. The synchronization will not be described in more detail in this specification, since it is prior art known per se. If necessary, after the receiving channel has been synchronized to the signal of a satellite SV1, SV2, SV3, SV4, the demodulation and storage of the navigation information transmitted in the signal can be initiated, if possible. The digital signal processor 3 stores navigation information preferably in a memory 4. In the method according to the present invention, it is not necessary to modulate and store this navigation information, but the positioning receiver PR has to define the chip and epoch of the signals received from the satellites.

The wireless communication device MS also comprises mobile communication means MT for performing the functions of the wireless communication device, such as a second antenna 10, a radio part 11, audio means, such as a codec 14a, a speaker 14b and a microphone 14c, a display 12, and a keypad 13. However, it is obvious that a part of the functional blocks of the wireless communication device MS can be common to both the positioning receiver PR and the mobile communication means MT. For example the display 12 and the keypad 13 can be used in some applications also in connection with the positioning receiver PR, for example to show the result of the performed positioning. The control block 7 can also be common both for the control of the positioning receiver PR and the mobile communication means MT, or one or a plurality of individual control blocks can be arranged for both units.

In the mobile communication network MN every base station BS, BS', BS" has an individual identifier CGI (Cell Global Identity). For example in the GSM system the cell global identity CGI comprises preferably the following four parts:
mobile country code MCC,
mobile network code MNC,
location area code LAC, and
cell identity CI.

Thus, every base station BS, BS', BS" can be identified on the basis of the cell global identity CGI of this base station. The serving base station BS, BS', BS", that it, the base station through which the wireless communication device MS communicates with the mobile communication network MN at a time transmits the cell global identity CGI of the base station to the mobile communication device, preferably via a control channel of the mobile communication network MN. Thus, inter alia in connection with a base station handover the wireless communication device MN can detect the base station change on the basis of the change in the cell global identity CGI. In the method according to the invention the cell global identity CGI is advantageously utilized in the following manner. In the wireless communication device MS the information transmitted by the base station BS, BS', BS" is received, from which information inter alia on the cell global identity CGI is found out. According to this identity it is detected whether any information related to the position of this particular base station BS, BS', BS" is stored in the memory means 4, 8 of the wireless communication device. If no positioning data in accordance with the cell global identity is found in the memory means 4, 8, the necessary positioning data is searched from the data base DB. In this embodiment the positioning data is stored in the mobile communication network MN, for example in each base station BS, BS', BS", in the mobile switching center MSC, or in the GPRS packet network. The wireless communication device MS transmits to the mobile communication network MN a request to transmit the positioning data of the base station in question to the wireless communication device MS. It is not necessary to transmit the cell global identity of the base station in the interrogation message because the mobile communication network knows through which base station the connection to the wireless communication device is arranged at a time. As response, the base station transmits the positioning data of the base station and, if necessary, other auxiliary data in accordance with the satellite positioning system as well, such as the orbit parameters and the almanac data of the satellites. The transmitted information is received in the wireless communication device MS, wherein at least the positioning data of the base station is stored in the memory means 4, 8. In addition, the cell global identity CGI of the base station is stored, which can then be used as an index to the positioning data stored into the memory means 4, 8.

After the position of the serving base station is known in the wireless communication device MS, it is possible to utilize this positioning data of the base station in the positioning by setting it as the default position of the positioning receiver. According to this positioning data the wireless communication device is informed of the approximate position of the wireless communication device on the globe. On the basis of the time data transmitted by the base station it is possible to estimate in the wireless communication device which satellites are above the horizon, that is, visible as seen from the wireless communication device. Next, the wireless communication device can attempt to search for the signals of these visible satellites. Positioning can thus be performed in a manner known as such by first using this default position and by precisioning the positioning on the basis of the signals received from the satellites SV1 to SV4. Later in this specification there will be described an example on how said position of a known reference point can be utilized in the positioning.

As a wireless communication device MS moves from the coverage area of a base station to the coverage area of another base station (e.g. in FIG. 1 from the coverage area of a first base station BS to the range of a second base station BS'), the afore-mentioned detection of the base station data stored in the storage means 4, 8 is performed in connection with the handover to detect whether any information on this second base station is stored in the wireless communication device MS, or whether the information should be retrieved from the data base DB. Next, preferably the position of this second base station BS' is used as the default position of the wireless communication device MS in the positioning of the wireless communication device MS.

On the other hand, because it is known that the wireless communication device MS moved from the coverage area of one base station BS to the coverage area of a second base station BS', it is possible to use at this stage for example some other positioning data calculated on the basis of these two base stations, preferably the midpoint between these two base stations BS, BS', as the default position of the wireless communication device MS. In this case, it is very probable that in connection with a handover the wireless communication device MS is positioned closer to this midpoint than to either of the base stations BS, BS'. In this manner it is possible in some situations to faster achieve the wished positioning precision in the positioning receiver MS.

In some mobile communication systems, such as systems based on the CDMA, the wireless communication device MS can simultaneously communicate with more than one base station. Thus, as the default position of the wireless communication device MS can be used for example the positioning data calculated according to the position of those base stations that communicate simultaneously with the wireless communication device MS. For example, if three base stations are used in the communication, e.g. the geometric midpoint, which can be used as the default position, is calculated on the basis of the positioning data of these three base stations. It is obvious that the motion data of the wireless communication device MS can also be used in the definition of the default position, that is, in accordance with the previously performed positionings the direction of movement of the wireless communication device MS is estimated and, on the basis of this, attempt is made to select the base station positioned close to the direction of movement of the wireless communication device MS, e.g. the wireless communication device is moving towards one of these base stations.

In the above-described method according to a first preferred embodiment of the invention it was presumed that the data base used in the positioning data of the base stations is located in the mobile communication network, wherein the positioning data can be retrieved from the mobile communication network. The positioning data can also be transmitted enciphered. In this case an enciphering code required in the deciphering is retrieved to the wireless communication device MS from the mobile communication network, for example as point-to-point messages. This kind of messaging is usually subject to a charge to the user of the wireless communication device, wherein the user has to pay for the positioning data of the base stations that he/she has retrieved. However, by using the method according to a first preferred embodiment of the invention it is possible to decrease the need to retrieve auxiliary data, because the auxiliary data is stored in the memory means 4, 8 of the positioning receiver at the stage when new or changed data is received.

Figure 3:
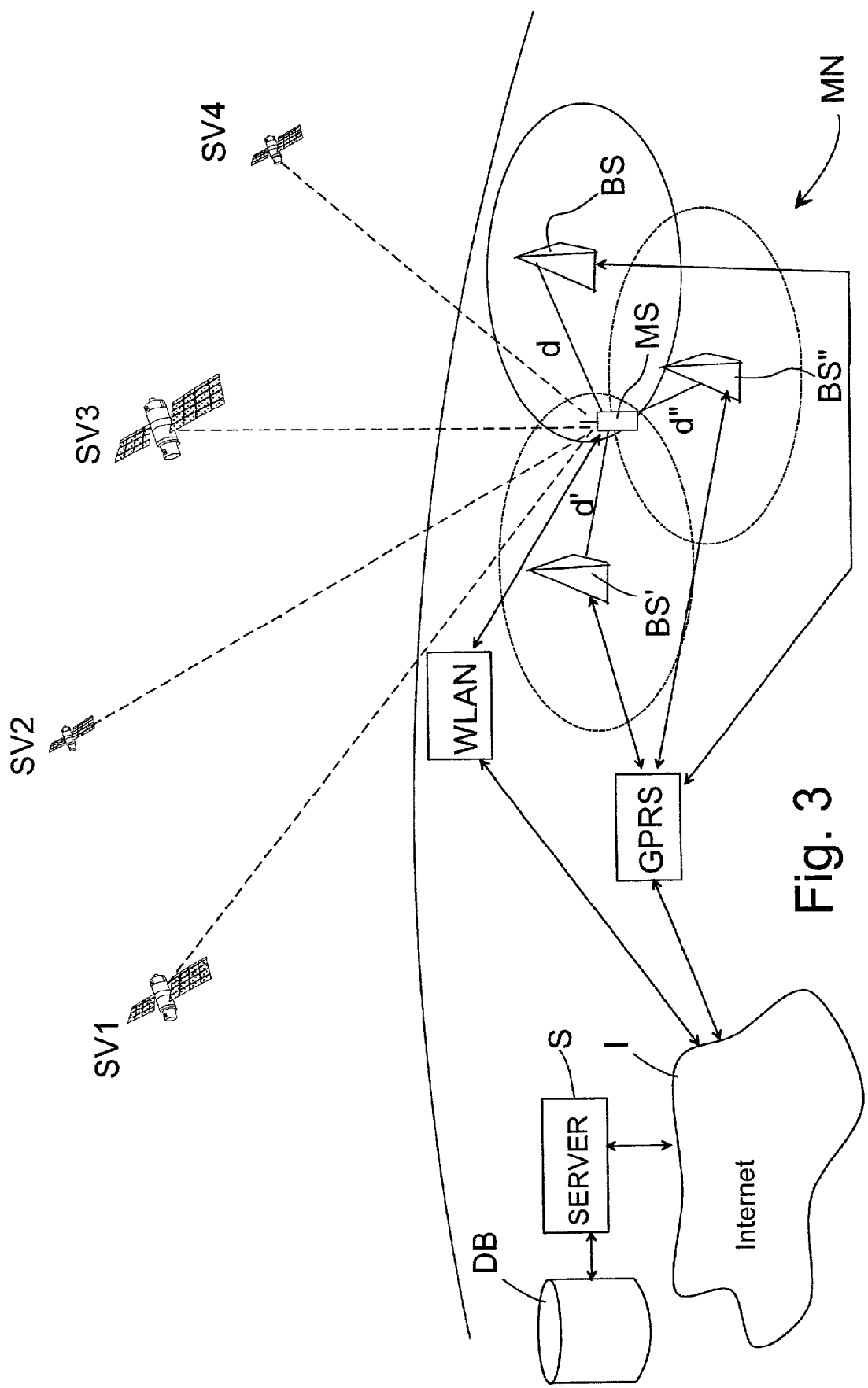
FIG. 3 shows a positioning method applying the method according to a second preferred embodiment of the invention in a reduced flow chart.

In the following, a method according to another preferred embodiment of the invention is described, in which auxiliary data is not retrieved from the mobile communication network, but from a data base DB provided elsewhere, e.g. in the Internet network I. FIG. 3 illustrates, in a reduced chart, a system in which this method according to a second preferred embodiment of the invention can be applied. The data base DB is located in such an information network or information system which can communicate with a mobile communication device. The data base DB is arranged for example in a data base server S that is connected to communicate with the Internet network I. Identification data and position of base stations are stored in the data base DB. Through the data base server S possibly other auxiliary data of the satellite positioning system can also be downloaded to the wireless communication device MS.

The communication connection set up from the wireless communication device MS can be for example a connection according to a so-called WAP protocol, by means of which the wireless communication device MS can be used for example for browsing information on the Internet network, inter alia www pages of companies and other sites where data is stored. In this case, from the memory means 4, 8 of the wireless communication device MS the BS position data is retrieved, in accordance with which it is possible to communicate with said data base server S that maintains the data base DB for the positioning data of the base stations. In addition to this position data the data base identifier CGI of the base station is detected and transmitted for example as messages according to said WAP protocol to the mobile communication network, where the messages are converted preferably to messages according to the Internet Protocol and transmitted further to the Internet network in a manner known as such. The identifier of the wireless communication device MS that has transmitted the message is also added to the messages, wherein the response messages can be transmitted back to the communication device that has transmitted the interrogation message. Another example that can be mentioned in this context is the use of short messages (SM) in transmission of positioning data and possible auxiliary data.

Setting up a communication connection with the data base server S can in some situations be performed also for example with a wireless local area network WLAN. Thus, the wireless communication device MS creates a communication connection with a wireless local area network, which is situated in the vicinity of a wireless communication device MS and through which for example the Internet network I can be contacted.

In the Internet network the messages are transmitted to the target address, in this case to the data base server S in which said data base DB is located, by using the message transmission mechanisms of the Internet network, in a manner known as such. The data base server interprets the arrived message and detects, on the basis of the cell global identity CGI of the base station that has been transmitted in the message, the information about this base station from the data base DB. Next, the data base server creates a response message comprising said positioning data, if positioning data related to said base station are stored in the data base DB. Subsequently, the response message is transmitted from the data base server S to the Internet network I, where the message is routed to the mobile communication network MN. The mobile communication network transfers the response message to the base station which is communicating with the wireless communication device at the time. The base station sends the response message to the wireless communication device MS. Next, in the wireless communication device MS the received positioning data is stored into the memory means 4, 8, and the positioning is performed, if necessary.

In this method according to a second preferred embodiment of the invention the default position of the wireless communication device MS is also defined according to the positioning data of one or a plurality of base stations. When the wireless communication device MS moves to the range of a base station BS, BS', BS", an interrogation message can be transmitted from the wireless communication device requesting the positioning data of said base station to be transmitted to the wireless communication device, in case the positioning data are not yet stored in the wireless communication device MS. This interrogation message is transferred to the data base server S, where it is detected whether the information related to said base station is found in the data base DB. If the data are found in the data base DB, the data are transmitted to the wireless communication device MS. The positioning can thereafter be performed in the positioning receiver PR by using this positioning data of the base station as the default position. In the same context, positioning data of several base stations BS, BS', BS" can be transmitted, and for example the data base server S finds out which base stations are positioned in the vicinity of said base station, e.g. the base stations of the adjacent cells. In this case the data base server transmits to the wireless communication device MS also positioning data of these base stations positioned close to said base station. This arrangement provides the advantage that when the wireless communication device MS is moving from the range of one base station to the range of a second base station the wireless communication device MS already has the positioning data of this second base station.

Even if an existing mobile communication network MN can also be utilized in the transfer of the positioning data of the base stations BS, BS', BS" in this embodiment, the positioning data are retrieved from outside the mobile communication network MN. The transfer service of such positioning data of the base stations BS, BS', BS" can be arranged to be independent of operators. Thus, service providers can themselves price the service and, on the other hand, limit the use of the service if necessary. A service provider can be for example an Internet service provider, that gives preferably to registered users the possibility to retrieve information from the data base DB.

In practise, the data base DB can be decentralized, wherein a plurality of data base servers S of a preferred embodiment of the invention can be located in different geographical locations. Thus, when a user arrives close to such a data base server S, a communication connection can be set up between the data base server S and the wireless communication device MS, for example by using a local communication method, such as a so-called Bluetooth or WLAN connection. Through this connection it is possible to transfer for example the positioning data of one or a plurality of reference points of the neighbouring area to the wireless communication device MS.

In addition to the positioning data of the base station the default position of the wireless communication device MS can also in some embodiments be the WLAN access point, the positioning data of which is known and the signals transmitted by which have the necessary information for the identification of the access point. The positioning data of other short-range access points or the like, such as the Bluetooth system, can be applied in connection with the method of the invention if the location of these access points is known and the access points can be identified in the wireless communication devices.

Even if in the above described examples the cell global identity CGI of the base station has been used in the identification of the base station, it is obvious that other identification methods can also be applied. Examples to be mentioned include the country code, which in some cases (for example Monaco) expresses a sufficiently small geographical area in view of the positioning according to the invention. The mobile network code MNC can also in some cases indicate the default position of the wireless communication device MS at a sufficient precision.

The directional pattern of the base station antenna is not necessarily omnidirectional, but it can be directed to some direction. Antenna structures are also known in which the direction of the directional pattern can be changed to a wished direction, for example towards a wireless communication device in order to improve the signal-to-noise ratio in this direction. The directional pattern can also be composed of a plurality of segments directed to different directions. In these kind of situations the default position used is not necessarily the position of the base station, but a point determined according to the directional pattern of the base station, such as the center of the directional pattern. This can is some systems be calculated for example in such a manner that the parameters of the directional pattern are transmitted from the mobile communication network to the wireless communication device, or the calculation is performed in the mobile communication network from which the location obtained as a result of the calculation is transmitted to the wireless communication device.

In the system according to a second preferred embodiment of the invention the information of the data base DB can be updated for example as follows. When a wireless communication device MS has successfully determined its position and is positioned inside the operative area of a base station BS, or BS', or BS" (Note: MS is communicating actively only with one BS, but it has knowledge about the neighbouring stations) and connected to this base station, the wireless communication device transmits the information on its location, the cell global identity CGI of the base station and advantageously also the information on timing advance TA, for example via the mobile communication network MN, to said data base server S in which the data base DB is located. Thus, the data base server S updates information of said base station in the data base DB according to the positioning data transmitted from the wireless communication device MS. However, this data is not necessarily the precise position of the base station, because it is, nevertheless, not probable that the wireless communication device MS would be positioned exactly at the base station. However, these positioning data located in the coverage area of the base station can be used as reference points, because these reference points are, nevertheless, relatively close to the base station. In this case, a group of positioning data is stored into the data base with the cell global identity CGI of said base station, which data can be transmitted to the wireless communication device MS that has requested for the positioning data. When a plurality of wireless communication devices having a positioning receiver perform positioning within the coverage area of a base station and transmit the information on their position to the data base server it is thus possible, on the basis of a set of data, to calculate e.g. a mean value, a geometric center or the like, which is sent as the reference point to the wireless communication device MS. In this case the position data of the BS's can also be created by using the system. Moreover, this arrangement does not require that the operator of the mobile communication network would be involved in the system maintenance, that is, the system is operator independent.

Said advance timing data can be used in the data base server S in order to estimate how close to said base station BS, BS', BS" the wireless communication device MS is located. The smaller the advance timing the closer to the base station the wireless communication device is normally located.

Wireless communication devices can transmit said positioning data and other information to the data base server S for example at regular intervals, or when a predetermined criterion is fulfilled, for example when the cell global identity CGI of the base station is changed. Additionally, a local data base containing information on the position of the data bases can be created in the wireless communication device MS. Thus, the wireless communication device can transmit the positioning data of the base stations that it has stored to a second wireless communication device and/or to a data base server, for example as short messages, wherein these data can be used also in the positioning functions of this second wireless communication device and, on the other hand, the data base DB of the data base server is updated. The transmission of data to the second wireless communication device can be initiated e.g. by the user of the wireless communication device.

When describing above the preferred embodiments of the invention it was noted that the wireless communication device makes a request on the positioning data of the base stations while the wireless communication device is located within the range of a certain base station. The invention can also be applied in such a manner that the wireless communication device performs an information request for example when the positioning receiver PR and/or the mobile communication means MT are switched on. In this case, the information that relates for example to the position of base stations BS, BS', BS" in a certain geographical area can be transmitted to the wireless communication device MS, and the information can be used without a delay at the stage when the wireless communication device MS is moving within the range of the mobile communication network. Thus, it is not necessary to waste time for the transfer of base station data, but the information already exists stored in the memory means 8 of the wireless communication device.

This, in its part, cuts down the power consumption of the wireless communication device MS and also decreases the load to the mobile communication device MN, because the need for data transfer is diminished. It is obvious that this alternative also allows to detect which base station data is already stored in the wireless communication device MS, whereby it is not necessary to transfer these data again, unless there has been changes in the data.

By using the above-described method, the positioning can be performed also in poor signalling conditions. Also, no precise time data is required if the position of the reference point is known. Moreover, the transmission of auxiliary data is not dependent on the positioning services provided by the operator.

In the following, an example is given on how said positioning data of the base station can be used in the positioning of a wireless communication device. In the definition of time of transmission ToT according to the formula (1), only the number and code phase $T_{chip}^j(k)$ of the chips received after the epoch change can be defined in a situation in which the strength of the signal to be received is weak. By means of this parameter it is possible to measure only the differences on the chip level (<1 ms) in the signals of different satellites SV1, SV2, SV3, SV4, because the same code is repeated at intervals of one epoch (=1 ms). Because the distance between each satellite and receiver can differ significantly, there may be large differences, even differences over 10 ms, in the times of flight of signals received from different satellites. Thus, the definition of the differences on the chip level is not sufficient. One millisecond in time represents a distance of approximately 300 km when the signal propagates substantially at the speed of light.

Correspondingly, one chip (approximately 1 μs=1 ms/1023) equals approximately 300 meters.

In such a situation the differences of milliseconds have to be defined in different receiving channels on the basis of the distances between the satellites SV1, SV2, SV3, SV4 and the wireless communication device MS. However, generally the estimated location of the wireless communication device MS is not necessarily known. Instead, in the systems according to FIGS. 1 and 3 it is possible to estimate the location of the wireless communication device MS by using a selected reference point, such as the location of the base station BS. Thus, the positioning data of the base station BS, BS', BS", the orbit parameters of the satellites SV1, SV2, SV3, SV4, and the time data stored into the memory means 4, 8 can be used in the wireless communication device MS. In the GSM mobile communication system the distance between the wireless communication device and the base station with which the wireless communication device is communicating at the time is generally about 30 kilometers at the most. In this case it can be assumed that the wireless communication device MS is located within a radius of 30 kilometers from the location of the base station BS. Thus, the time of flight of the signal transmitted by the satellite from the satellite to the base station and the time of flight from the satellite to the wireless communication device differ approximately 100 μs at the most. The distance between the wireless communication device MS and the base station BS in view of the times of flight does not change to a significant degree either within the base station BS range, wherein it can be assumed that there is a difference of less than one millisecond in the reception times of the same signal in the wireless communication device MS and in the base station BS. Thus, the distance can be calculated at an accuracy of one millisecond as follows:

$$\hat{N}_{ms}^j(k) = \left\lceil \frac{\|\bar{x}_{SV}^j(k) - \hat{\bar{x}}_u\|}{c} \right\rceil \quad (2)$$

in which $\lceil . \rceil$ indicates rounding up to the nearest integer, and the line above the variable indicates that it is a vector. In this case, the same result is obtained both in view of the base station BS and in view of the wireless communication device MS. It has been possible to transmit from the base station BS a sort of estimate of the GPS time $\hat{T}_{GPS}$ to the wireless communication device MS. If this GPS time data is very precise, it is possible to calculate also the position of the satellites very accurately, wherein errors in positioning can mainly be caused by the distance between the wireless communication device MS and the base station BS, which is not necessarily known. Even if no time data were transmitted from the base station to the wireless communication device, the wireless communication device contains some kind of an estimation of the GPS time $\hat{T}_{GPS}$, e.g. the time of the reference clock 15, which, at this stage, can be several seconds, even minutes fast or slow.

After the distance $\hat{N}_{ms}^j(k)$ in time has been calculated in milliseconds for all receiving channels according to formula 2, it is possible to estimate the times of transmission of the signals according to the following formula.

$$\hat{T}_{ToT}^j(k) = T_{GPS}^j(k) - \hat{N}_{ms}^j(k) + T_{chip}^j(k) \quad (3)$$

Any measured value of the time of transmission of the satellite signal can be selected as the reference time. The time of the satellite at the time of reception, i.e. the GPS time, $\hat{T}_{GPS}(k)$, can thereafter be estimated by supplementing the time of transmission ToT attained on the basis of the measurement selected as reference time with the estimated transfer delay, i.e. the time of flight of the signal from the satellite to the receiver. The estimated transfer delay is usually 78 ms.

$$\hat{T}_{GPS}(k) = \hat{T}_{ToT}^j(k) + 0.078 \quad (4)$$

After the GPS time has been preliminarily defined, it is possible to define the measured pseudoranges by subtracting the calculated times of transmission of the signal from the estimated GPS time and multiplying the result with the speed of light in the following manner:

$$\rho_m^k = (\hat{T}_{GPS} - \hat{T}_{ToT}^j(k))c \quad (5)$$

in which c indicates the speed of light in a vacuum, the superscript k indicates from which satellite signal the measured value comes from (e.g. 1 to 4) and the subindex m indicates that the pseudorange is a measured pseudorange, not an estimated one.

The estimated pseudoranges are calculated in relation to the location $\bar{x}_u$ of the wireless communication device MS and to the locations $\bar{x}_{SV}^j(\hat{T}_{GPS})$ of the satellites at an estimated time of transmission ToT. The selected default location of the wireless communication device is the location of the base station BS which is communicating with the wireless communication device at the time. The locations of the satellites are calculated as a function of time by means of equations known as such. Here, for the sake of simplicity, the estimated pseudoranges are expressed by means of the following formula:

$$\rho_p^k = f(\hat{T}_{GPS}, \bar{x}_u) \quad (6)$$

to indicate that the estimated pseudoranges are based solely on the estimated GPS time and to the estimated location of the wireless communication device. In formula (6), the term f represents a (strongly) non-linear function, the subindex ρ indicates that this is estimation, and $\bar{x}_u$ is the estimated location of the wireless communication device, in which the line above the variable indicates that it is a vector.

The location $\bar{x}_u$ of the wireless communication device and the difference between the estimated GPS time and the real GPS time can be calculated iteratively for example by the least mean squares method. This method is known as such. In the least mean squares method the following set of equations is solved:

$$\rho_m^k = |\bar{x}_{SV}^j(k) - \bar{x}_u| + ct_u, j=1 \ldots M \quad (7)$$

The aim is to find such location data $\bar{x}_u$ and time error $\Delta t_u$, which best suit to a number M of measurements. The solution of this set of equations is straightforward as such:

$$\begin{bmatrix} \Delta \hat{\bar{x}}_u \\ \Delta t_u \end{bmatrix} = (H^T H)^{-1} H^T \Delta \bar{\rho} \quad (8)$$

in which $$\Delta \bar{\rho} = \bar{\rho}_m^j - \bar{\rho}_p^j, j=1 \ldots M \quad (9)$$

$\Delta \bar{x}_u$ is the correction vector of the location,
$\Delta t_u$ is the correction of the time error,
and
H=the linearized Jacob's matrix of the pseudoranges estimated in point $\bar{x}_u$.

The solution given by the least mean squares method is optimal with respect to the sum of squared errors (SSE). This sum of squared errors can be estimated by means of a formula:

$$SSE \cong \left(\Delta \bar{p} - H \begin{bmatrix} \Delta \hat{\bar{x}}_u \\ \Delta t_u \end{bmatrix}\right)^T \left(\Delta \bar{p} - H \begin{bmatrix} \Delta \hat{\bar{x}}_u \\ \Delta t_u \end{bmatrix}\right) \quad (10)$$

By rearranging the terms and using slightly different expressions for the terms, it is possible to write the formula (7) in the following manner:

$$\rho_m^j(T_{GPS}) = |\bar{x}_{SV}^j(\hat{T}_{GPS}) - \bar{x}_u| + ct_u, j=1 \ldots M \quad (11)$$

The parentheses indicate that the term in question is based on the parameter presented in the parentheses. When such a presentation mode is used, it can be clearly seen that the measured pseudoranges are functions of the real GPS time and the rest of them are functions of the estimated GPS time. Thus, the time difference between the estimated GPS time and the actual GPS time can be calculated according to the measurements, and in this case it is also possible to synchronize the receiver to the actual GPS time. The time error of the receiver can be here expressed as the time difference according to the following formula:

$$\Delta t_u \cong \Delta T = T_{GPS} - \hat{T}_{GPS} \quad (12)$$

in which $\Delta t_u$ represents the estimated time (or calculated) clock error and $\Delta T$ is the actual clock error between the estimated time, $\hat{T}_{GPS}$, and the real GPS time.

It is now possible to use this time difference in a wireless communication device MS to correct the estimated GPS time, whereafter it is possible to better calculate the satellite locations in order to perform positioning particularly in a situation where the calculated time difference is significant.

The calculation of distance as described above in formula 2 can in some situations cause rounding errors. For example, if the distance in milliseconds prior to rounding down is close to the next integer and the wireless communication device MS is close to a base station BS, an error closing to one millisecond can occur. This can mean an error of up to 300 km when calculating the distance between the wireless communication device and the satellite, which distorts the positioning to a significant degree. In some cases, this error can be detected from the height data calculated for the position of the wireless communication device, which height data indicates that the wireless communication device is located at an altitude of tens of kilometers or deep below the ground. In this case, the error is easy to verify. However, this is not always the case. The method according to a preferred embodiment of the invention utilizes the information that the wireless communication device MS is close to the base station BS, the position of which is known at a sufficient precision. In this manner, it is possible to set the limits within which the positioning data calculated for the wireless communication device MS should be. This limit is in the direction of the earth's surface e.g. a base-station-centered circle having a radius of approximately 30 km. Correspondingly, appropriate limit values can be defined in the elevation. If the calculation gives to the wireless communication device MS a positioning data that is outside said limit, it can be assumed that the rounding has caused an error. Subsequently, it is determined at which satellite/satellites the error has occurred. This can be performed by examining the remainders of the values calculated with the formula 2.

By using this method it is possible to fast detect the possible errors caused by rounding and to perform the necessary corrective actions. Another method for detection of rounding errors is to examine the error values calculated with formula 9 and if a value differs clearly from the other values (is significantly larger), the rounding has probably caused the error in the calculation of the distance of the satellite corresponding to said value.

It is obvious that the present invention is not limited solely to the above-presented embodiments, but it can be modified within the scope of the appended claims.

The invention claimed is:

1. A method for positioning of a wireless communication device comprising:
   storing position data of a plurality of reference points in at least one data base;
   examining which of the plurality of reference points are located in the vicinity of the wireless communication device;
   transmitting at least position data about more than one of the plurality of reference points located in the vicinity of the wireless communication device to the wireless communication device;
   calculating a default position of the wireless communication device from a geometric midpoint of the more than one reference points located in the vicinity of the wireless communication device; and
   using the default position of the wireless communication device to estimate a pseudorange between the wireless communication device and a satellite of a positioning system.

2. The method according to claim 1, further comprising:
   using base stations of a mobile communication network as the plurality of reference points;
   defining a cell global identity for each base station; and
   separating the plurality of reference points according to cell global identity when storing the position data.

3. The method according to claim 2, further comprising establishing the at least one data base in the mobile communication network.

4. The method according to claim 2, further comprising:
setting up a communication connection between the wireless communication device and a certain one of the base stations of the mobile communication network.

5. The method according to claim 2, wherein the position data of the base stations is transmitted to the wireless communication device.

6. The method according to claim 2, further comprising:
setting up the at least one data base in a data base server; and
establishing a communication connection from the at least one data base to the wireless communication device to transfer the position data between the wireless communication device and the at least one data base.

7. The method according to claim 6, wherein a connection according to a WAP protocol is used as said communication connection.

8. The method according to claim 1, further comprising storing information on the position of the plurality of reference points in the wireless communication device.

9. The method according to claim 8, further comprising:
transmitting a cell global identity of a base station communicating with the wireless communication device to the wireless communication device;
determining whether any position data based on a cell global identity of a new base station are stored in the wireless communication device when the new base station communicates with the wireless communication device; and
sending a request from the wireless communication device for transmission of positioning data to the wireless communication device when no position data based on the cell global identity of the new base station are stored in the wireless communication device.

10. The method according to claim 1, further comprising:
determining the position data of the plurality of reference points at least in the wireless communication device; and
transmitting the determined position data and identities of associated base stations to be stored in the at least one data base.

11. The method of claim 1, wherein the determination of the pseudorange between the wireless communication device and a satellite of the positioning system comprises one of:
a code phase;
a bit phase;
a subframe phase; or
a frame phase.

12. The method of claim 1, further comprising calculating the default position of the wireless communication device from the more than one reference points located in the vicinity of the wireless communication device and a direction of movement of the wireless communication device.

13. The method of claim 2, further comprising determining the position data of the more than one reference points from antenna directional patterns of the associated base stations.

14. A positioning system to be used in the positioning of a wireless communication device comprising:
at least one data base for storing a plurality of reference points;
means for detecting which of the plurality of reference points is located in the vicinity of the wireless communication device;
means for transmitting position data of more than one of the plurality of reference points located in the vicinity of said wireless communication device to the wireless communication device, wherein the transmitted position data of said the more than one reference points in the vicinity of the wireless communication device is used to calculate a geometric midpoint of the more than one reference points, wherein the geometric midpoint is used as a default position of the wireless communication device; and
means for estimating a pseudorange between the wireless communication device and a satellite of a positioning system using the default position of the wireless communication device.

15. The positioning system according to claim 14, wherein base stations of a mobile communication network are arranged to be used as the plurality of reference points, a cell global identity is defined for each base station, and the plurality of reference points are separated according to said cell global identity when storing position data of the plurality of reference points.

16. The positioning system according to claim 15, wherein the at least one data base is established in the mobile communication network.

17. The positioning system according to claim 15, comprising means for establishing a communication connection between the wireless communication device and a certain one of the base stations of the mobile communication network.

18. The positioning system according to claim 15, comprising means for transmitting position data of the base stations of the mobile communication network to the wireless communication device.

19. The positioning system according to claim 15, wherein the at least one data base is set up in a data base server, and that the positioning system comprises means for setting up a communication connection from the at least one data base to the wireless communication device to transfer position data between the wireless communication device and the data base.

20. The positioning system according to claim 19, wherein a connection according to a WAP protocol is used as said communication connection.

21. The positioning system according to claim 14, wherein information on the position of the plurality of reference points is stored in the wireless communication device.

22. The positioning system according to claim 21, comprising means for transmitting to the wireless communication device a cell global identity of a base station with which the wireless communication device is communicating;
the wireless communication device comprising means for determining whether position data based on a cell global identity of a new base station is stored in the wireless communication device when the new base station communicates with the wireless communication device, wherein a request to transmit position data to the wireless communication device is arranged to be transmitted from the wireless communication device when no position data based on a cell global identity of the new base station is stored in the wireless communication device.

23. The positioning system according to claim 14, wherein the wireless communication device comprises:

means for determining position data for the plurality of reference points; and means for transmitting the determined position data and a cell global identities of base stations associated with the plurality of reference points, wherein the positioning system comprises means for receiving and storing said determined position data and cell global identities into the data base.

24. An electronic device to be used in a positioning system comprising at least:

positioning means;

means for performing functions of a mobile communication device;

means for detecting which of a plurality of reference points stored in a data base of the positioning system is located in a vicinity of the electronic device;

means for receiving position data of more than one reference points of the plurality of reference points located in the vicinity of the wireless communication device;

means for using the received position data of the more than reference points located in the vicinity of said wireless communication device to calculate a geometric midpoint of the more than one reference points, wherein the geometric midpoint is used as a default position of the wireless communication device; and means for using the default position of the wireless communication device to estimate a pseudorange between the wireless communication device and a satellite of a positioning system.

25. A method comprising:

storing position data of a plurality of reference points in at least one data base;

examining which of the plurality of reference points are located in the vicinity of a positioning module;

transmitting at least position data about more than one of the plurality of reference points located in the vicinity of the positioning module to the positioning module;

calculating a default position of the positioning module from a geometric midpoint of the more than one reference points located in the vicinity of the positioning module; and using the default position of the positioning module to estimate a pseudorange between the positioning module and a satellite of a positioning system.

26. The method of claim 25, wherein the determination of the pseudorange between the wireless communication device and a satellite of the positioning system comprises one of:

a code phase;

a bit phase;

a subframe phase; or a frame phase.

27. The method of claim 25, further comprising calculating the default position of the wireless communication device from the more than one reference points located in the vicinity of the wireless communication device and a direction of movement of the wireless communication device.

28. The method according to claim 25, further comprising:

using base stations of a mobile communication network as the plurality of reference points;

defining a cell global identity for each base station; and separating the plurality of reference points according to cell global identity when storing the position data.

29. The method of claim 28, further comprising determining the position data of the more than one reference points from antenna directional patterns of the associated base stations.

30. The method according to claim 28, further comprising establishing the at least one data base in the mobile communication network.

31. The method according to claim 28, further comprising:

setting up a communication connection between the positioning module and a certain one of the base stations of the mobile communication network.

32. The method according to claim 28, wherein the position data of the base stations is transmitted to the positioning module.

33. The method according to claim 28, further comprising:

setting up the at least one data base in a data base server; and establishing a communication connection from the at least one data base to the positioning module to transfer the position data between the positioning module and the at least one data base.

34. The method according to claim 33, wherein a connection according to a WAP protocol is used as said communication connection.

35. The method according to claim 25, further comprising storing information on the position of the plurality of reference points in positioning module.

36. The method according to claim 35, further comprising:

transmitting a cell global identity of a base station communicating with the positioning module to the positioning module;

determining whether any position data based on a cell global identity of a new base station are stored in the positioning module when the new base station communicates with the positioning module; and sending a request from the positioning module for transmission of positioning data to the positioning module when no position data based on the cell global identity of the new base station are stored in the positioning module.

37. The method according to claim 25, further comprising:

determining the position data of the plurality of reference points at least in the positioning module; and transmitting the determined position data and identities of associated base stations to be stored in the at least one data base.

38. A system comprising:

at least one data base configured to store a plurality of reference points;

a positioning module configured to detect which of the plurality of reference points is located in the vicinity of the positioning module;

a communication network configured to transmit position data of more than one of the plurality of reference points located in the vicinity of the positioning module to the positioning module, wherein the transmitted position data of the more than one reference points in the vicinity of the position module is used to calculate a geometric midpoint of the more than one reference points, wherein the geometric midpoint is used as a default position of the position module; and a processor configured to estimate a pseudorange between the positioning module and a satellite of a positioning system using the default position of the positioning module.

39. The system according to claim 38, wherein base stations of a mobile communication network are arranged to be used as the plurality of reference points, a cell global identity is defined for each base station, and the plurality of reference points are separated according to said cell global identity when storing position data of the plurality of reference points.

40. The system according to claim 39, wherein the at least one data base is established in the communication network.

41. The system according to claim 39, comprising a wireless communication device configured to establish a communication connection between the positioning module and a certain one of the base stations of the communication network.

42. The system according to claim 39, comprising means for transmitting position data of the base stations of the mobile communication network to the positioning module.

43. The system according to claim 39, wherein the at least one data base is set up in a data base server, and that the system comprises a wireless communication device configured to set up a communication connection from the at least one data base to the positioning module to transfer position data between the positioning module and the data base.

44. The system according to claim 43, wherein a connection according to a WAP protocol is used as said communication connection.

45. The system according to claim 38, wherein information on the position of the plurality of reference points is stored in the positioning module.

46. The system according to claim 45, wherein the communication network is configured to transmit to the positioning module a cell global identity of a base station with which the positioning module is communicating;
the positioning module comprising a processor configured to determine whether position data based on a cell global identity of a new base station is stored in the positioning module when the new base station communicates with the positioning module, wherein a request to transmit position data to the positioning module is arranged to be transmitted from the positioning module when no position data based on a cell global identity of the new base station is stored in the positioning module.

47. The system according to claim 38, wherein the positioning module comprises:
a control block configured to determine position data for the plurality of reference points; and
a transmitter configured to transmit the determined position data and a cell global identities of base stations associated with the plurality of reference points,
wherein the system comprises for a switching center configured to receive and store said determined position data and cell global identities into the data base.

48. An apparatus comprising:
a positioning module including
detection means to detect which of a plurality of reference points stored in a data base of a positioning system is located in a vicinity of the apparatus;
receiving means to receive position data of more than one reference points of the plurality of reference points located in the vicinity of the apparatus;
calculating means to calculate a geometric midpoint of the more than one reference points using the received position data of the more than reference points located in the vicinity of the apparatus, wherein the geometric midpoint is used as a default position of the apparatus; and
estimating means to estimate a pseudorange between the wireless communication device and a satellite of a positioning system using the default position of the apparatus.

* * * * *